United States Patent [19]

Marchus

[11] 4,177,967

[45] Dec. 11, 1979

[54] GUIDANCE ARM FOR TRIPOD APPARATUS

[76] Inventor: L. Mark Marchus, 123 NW. 2nd St., Ste. 209, Portland, Oreg. 97209

[21] Appl. No.: 847,401

[22] Filed: Oct. 31, 1977

[51] Int. Cl.² ............................................. F16M 11/04
[52] U.S. Cl. ..................................... 248/178; 354/82
[58] Field of Search ................... 42/71 R, 73; 173/30; 248/176–187; 352/95, 131, 243; 354/75, 76, 81, 82, 293

[56] References Cited

U.S. PATENT DOCUMENTS

| 286,447 | 10/1883 | Kilburn | 354/82 |
|---|---|---|---|
| 1,883,276 | 10/1932 | Zerk | 248/181 X |
| 2,753,778 | 7/1956 | Tolcher | 352/243 X |
| 2,806,416 | 9/1957 | Jones | 352/243 X |
| 2,945,428 | 7/1960 | Dearborn | 352/243 X |
| 2,962,251 | 11/1960 | Karpf | 248/183 |
| 3,016,802 | 1/1962 | Grunenberg | 248/186 X |

FOREIGN PATENT DOCUMENTS

| 1011309 | 4/1952 | France | 352/243 |
|---|---|---|---|
| 198753 | 9/1938 | Switzerland | 42/71 R |

Primary Examiner—Lawrence J. Staab

Attorney, Agent, or Firm—Crandell & Polumbus

[57] ABSTRACT

A guidance apparatus for controlling universal coupling movement of a tripod head includes control or guiding means operatively connected to the head of the tripod and extending therefrom to contact the upper torso of the individual using the tripod independently of the individual's hands. The individual's upper torso movement controls the universal movement of the tripod head. The guidance means preferably includes a guidance arm having a portion for contacting the shoulder front of the individual and a portion extending beneath the shoulder and between the upper arm and the upper torso. The portion extending between the upper arm and the upper torso is conveniently gripped by pressing the upper arm on the guidance means against the upper torso during movement of the upper body in controlling the tripod head. The means connecting the guidance means to the tripod head is selectively adjustable to position the guidance arm in the most desired position and is also selectively flexible to allow swiveling or universal movement of the guidance arm with respect to the tripod head during use.

13 Claims, 8 Drawing Figures

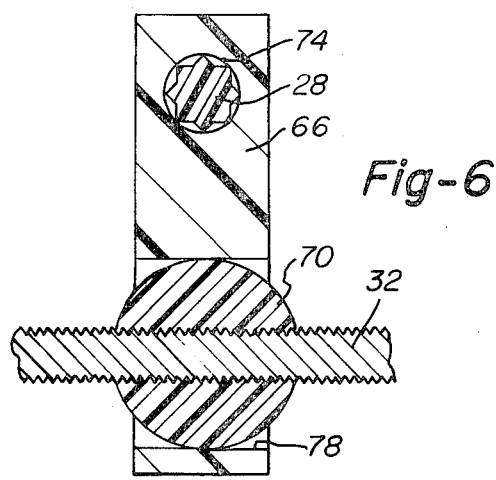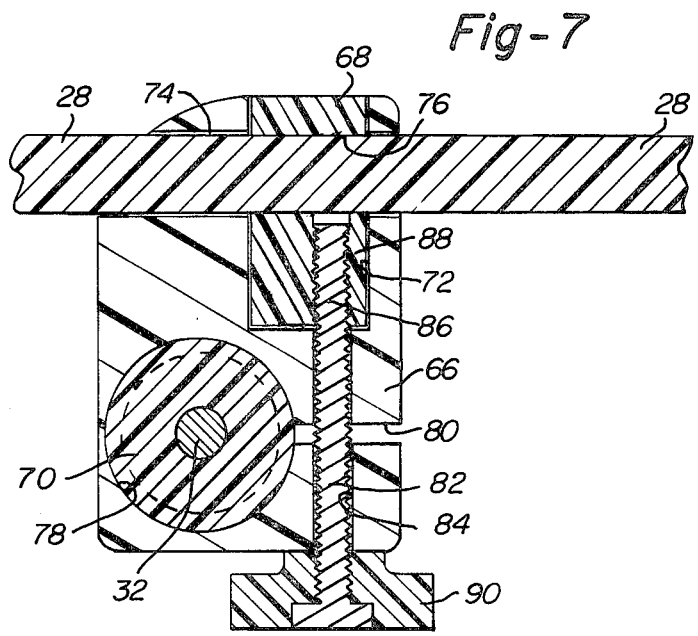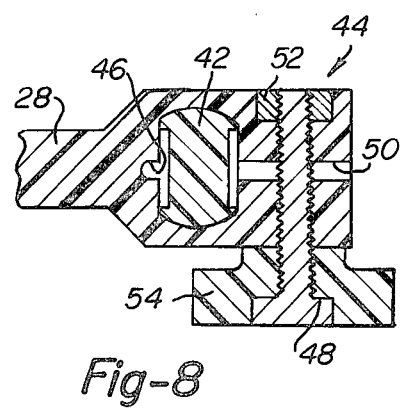

GUIDANCE ARM FOR TRIPOD APPARATUS

BACKGROUND OF THE INVENTION

1. Field of the Invention

This invention relates to tripod apparatus having universal movement heads associated therewith, and more particularly to guidance apparatus for use by an individual in controlling the tripod head movement through desired angular orientations. The present invention is particularly useful in conjunction with tripods used in tracking or photographing moving objects.

2. Brief Description of Prior Art

Tripods are typically used for stabilizing devices such as cameras free of spurious and unintended movements. Probably the most widespread use of tripods is in photography, where tripods are particularly useful in insuring clear and unblurred photographs. Other types of stabilizing apparatus used in photography include handles connected to the camera itself for gripping by the photographer and various body harnesses and supports for stabilizing the camera with respect to a portion of the photographer's body.

Tripod apparatus are generally of two types. The first type is a tripod having a hydraulic fluid-controlled universal movement head. Tripods of this type are typically very expensive and usually used in professional photography situations involving the photography of moving objects. The other type of tripod apparatus is one employing a mechanical friction-controlled universal head. Tripods having mechanical friction-controlled heads are typically relatively inexpensive and are usually used for photographing stationary objects.

Conventional friction-controlled tripod heads are difficult to properly control when photographing moving objects in multiple planes, such as when simultaneously photographing in a panning (horizontal) and tilting (vertical) manner. In general, graceful transitions tend to be traced in exaggerated curves, and smooth continuous arcs tend to be squared-off or jagged. These problems probably result because the short control handle attached to the tripod head allows a wide latitude and potential for rapid exaggerated movement of the tripod head when tracing the path of the moving object. Furthermore, to adequately trace the path of the moving object, the mechanical friction-controlled tripod head must be adjusted to a condition essentially free of friction to avoid inhibiting the movement of the tripod head as the path is traced. The problem of not accurately tracing the curved paths of moving objects is not present in the relatively expensive hydraulic fluid-controlled tripod heads. The hydraulic arrangement of these tripod heads presents sufficient resistance to rapid transitions and spurious movements to secure graceful movement in controlling the camera angle while tracing the path of the moving object.

Another undesirable characteristic of the typical mechanical tripod is that it is relatively unstable in wind and under various other environmental effects. The light weight of the tripod generally accounts for this instability, and the light weight is essentially a function of the tripod's relatively inexpensive cost.

There are certain undesirable features present in most tripods in general. One such undesirable feature is that one hand must grip the control handle extending from the universal movement head, and consequently this hand gripping the control handle is unavailable for use in controlling the camera. In some photography situations, it is necessary or desirable that the photographer have both hands available for controlling the camera as the camera angle is changed while following the path of the moving object. For example, the photographer may wish to adjust the shutter release and focus and lense settings with one hand while simultaneously advancing the film with the other hand. To utilize both hands in controlling the camera while simultaneously changing the camera angle on a tripod head is virtually impossible or at least extremely difficult with a conventional tripod.

Another problem with tripods in general is that the camera is generally limited to approximately a seventy-five degree pan or movement in the horizontal axis. This limitation apparently results from the limited amount of physical body movement attainable by the photographer when operating the tripod in the usual manner. The usual manner of use is for th photographer to simultaneously sight through the eye piece of the camera, grip the control handle and position the hand and gripped control handle adjacent the photographer's chest. In this physical arrangement, the photographer's upper torso cannot pivot significantly from side to side to increase the camera angle since to do so would typically tilt or jar the tripod or change the alignment of the eye, chest and hand with respect to the camera and control handle.

Other limitations and disadvantages of the prior art tripods are known and appreciated, and limited solutions to some of these problems have been achieved. In general, however, the various factors, problems, limitations and disadvantages present in the prior art can be more fully recognized and appreciated in light of the teachings and improvements of the present invention.

SUMMARY OF THE INVENTION

The general objective of the present invention is to provide a new and improved guidance apparatus for controlling the universal movement head of a tripod, which attains many advantages and avoids many of the problems and limitations of prior art. Specifically, the guidance apparatus of the present invention allows the effective and desirable use of a relatively inexpensive and commonplace tripod having a mechanical friction-controlled universal movement head to obtain results similar to the desirable results attained from a more expensive hydraulic fluid-controlled head of a tripod. The guidance apparatus controls the universal movement head to trace curves and transitions in a graceful and accurate manner without significant exaggeration, fluctuation or discontinuity. Relatively light weight tripods can be more securely stabilized against spurious movement, as a result of certain aspects of the present invention. The guidance apparatus frees the photographer's hands for controlling functions and operations of the device controlled by the tripod head, such as a camera, while simultaneously and continuously changing the tripod head angular orientation. In addition, a wider range of camera angles and movement is available when the present invention is used with a tripod in photography.

In accordance with its general aspects, the present invention comprises a control and guidance means operatively attached for controlling movement of the tripod universal movement head and positioned to contact a portion of the individual user's body independently of the user's hands. The control and guidance means may include a guidance arm piece having a curved portion adapted for contacting the shoulder front of the user and an arm grip extension extending between the upper arm and upper torso of the user. Connection means for connecting the guidance arm to the tripod head allows sufficient flexibility to control the tripod head with a wide latitude of upper body movement, and the universal movement head is controlled in a graceful and fluid-like manner primarily through movement of the upper torso of the user. The hands of the user are free for use in controlling the camera, for example, and the tripod may be more thoroughly stabilized and controlled by pressing the arm grip portion of the guidance arm piece against the upper torso with the upper arm of the user.

A more complete understanding of the invention can be obtained from the appended claims which specifically define the invention and from a description of a presently preferred embodiment also shown in a drawing consisting of a number of figures.

BRIEF DESCRIPTION OF THE DRAWINGS

FIG. 6 is a section view of FIG. 4 taken in the plane of line 6—6.

FIG. 7 is a section view of FIG. 3 taken in the plane of line 7—7.

FIG. 8 is a section view of FIG. 5 taken in the plane of line 8—8.

DESCRIPTION OF PREFERRED EMBODIMENT

Figure 1:
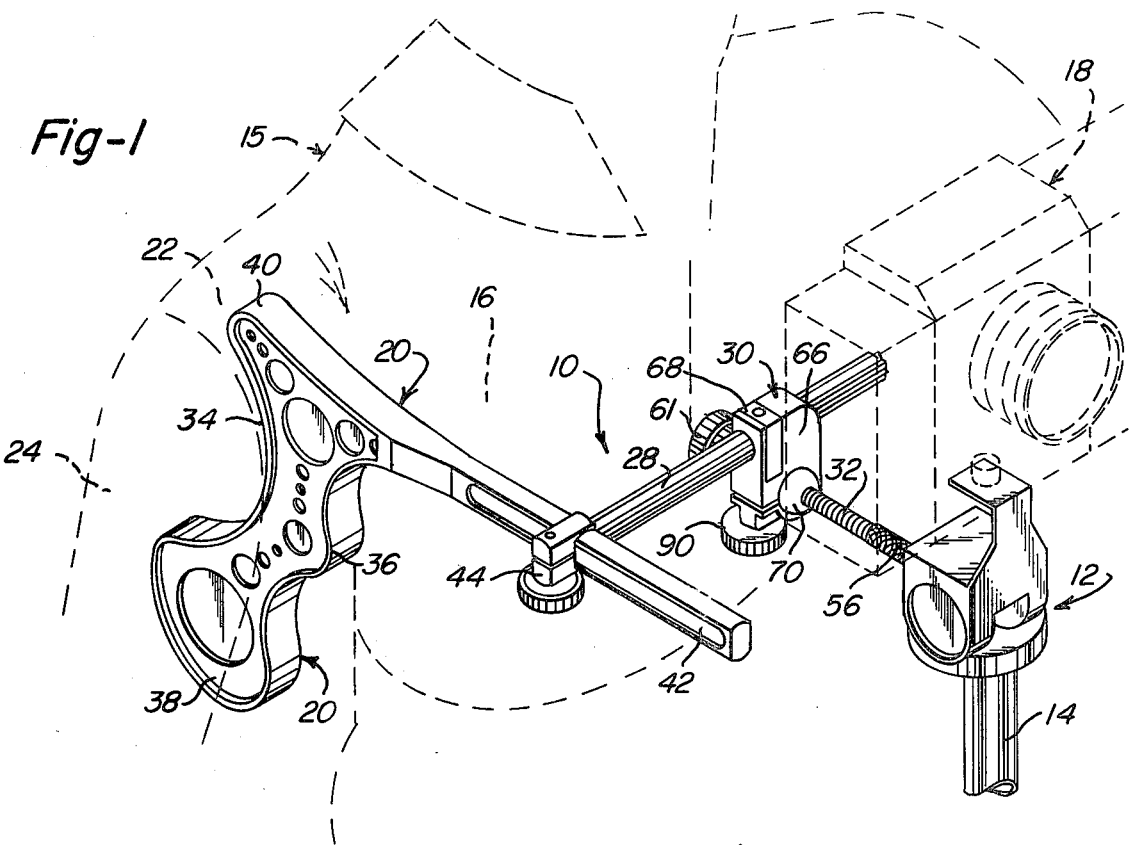
FIG. 1 is a perspective view of the guidance apparatus of the present invention used for controlling universal movement of a head of a tripod, and also illustrating in phantom a portion of the upper torso of an individual using the apparatus and a camera mounted on the universal movement head of the tripod.

A guiding apparatus 10 for controlling universal movement of a conventional tripod head 12 of a conventional tripod 14 can be generally understood by reference to FIG. 1. An individual illustrated generally at 15 controls movement of the tripod head 12 by moving the apparatus 10 with movement of the upper torso 16. Movement of the tripod head 12 changes the angle of a device attached to the tripod head, for example a camera 18. The tripod head 12 is of the well-known type providing relative rotation about two mutually perpendicular axes and thereby allowing universal angular movement in the three mutually perpendicular reference planes. The tripod head 12 may be of the well-known friction-controlled type widely used by photographers such as the individual 15 in the situation illustrated. Of course, the tripod 14 is one example of support means for substantially stably supporting the universal movement head, and any device such as a camera attached thereto, independently of the individual using the support means.

The guidance apparatus 10 generally comprises a control means or guidance arm piece 20 for operatively controlling movement of the tripod head 12 independently of the hands of the individual 15. The guidance arm 20 is adapted for abutting the shoulder 22 and for extending between the upper arm 24 and the upper torso 16 of the individual 15. The guidance arm 20 is operatively connected to the tripod head and positioned to contact the upper torso of the individual at the shoulder 22 by connection means comprising a side arm or extension member 28, a universal assembly means 30, and a shaft member 32. The connection means thus comprised provides a selectively adjustable and controllable universal movement connection between the guidance arm 20 and the tripod head 12, as will be more fully described. As an operative result of using the apparatus 10, side to side movement of the individual's torso controls the universal movement of the tripod head 12 to a greater extent and with better results then previously obtained with conventional tripod head control handles. Details of construction and operation of the apparatus 10 can be more completely understood from the following description.

Figure 5:
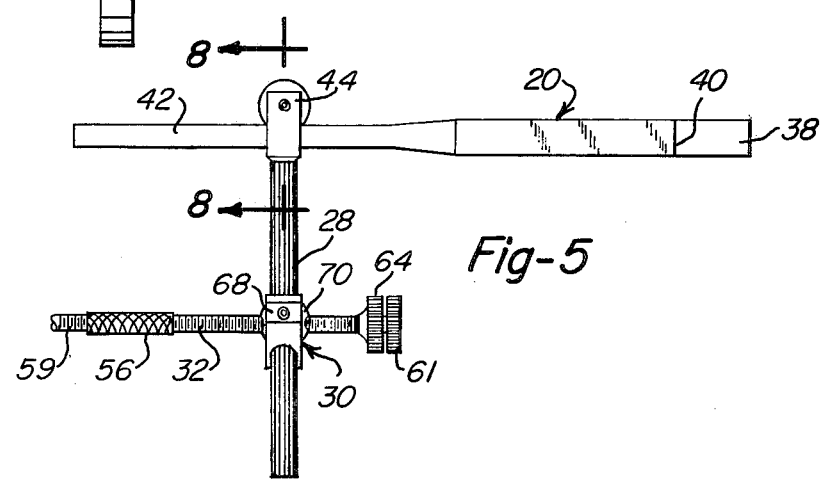
FIG. 5 is a top plan view of the apparatus of FIG. 4 taken in the plane of line 5—5.

The guidance arm piece 20 is shown best in FIGS. 2 and 3 and comprises a curved portion 34 adapted for contacting the shoulder front of the individual, and an arm grip extension portion 36 extending below the curved portion 34 and adapted to be gripped between the upper arm 24 and the upper torso 16 of the individual. The arm grip extension 36 generally includes an enlarged terminal end portion 38 of generally planar or flat characteristics (see FIG. 5) adapted to facilitate gripping by the upper arm by providing more area for the upper arm to parallelly contact against the upper torso. A corner piece 40 extends from the curved portion 34 above the shoulder 22 of the individual to prevent the shoulder from slipping vertically above the curved portion 34. A projection member 42, also shown in FIG. 5, extends generally forward from the curved shoulder abutting portion 34. The projection member 42 is elongated for the purpose of allowing selective positioning or adjusting of the distance between the curved shoulder abutting portion 34 and the extension member 28. The I-shaped cross sectional construction of the projection member 42 (FIG. 8) withstands the frictional retaining forces supplied by the extension member 28.

The side arm or extension member 28 is best understood by reference to FIGS. 2, 4, 5 and 8. An end 44 of the extension member 28 includes a U-shaped frictional retaining means for selectively and operatively retaining the projection member 42 of the guidance arm 20 to the extension member. Details of the end retaining means are best seen in FIG. 8 to include an aperture 46 for slideably receiving the projection member 42 therethrough, and a screw-type fastening means 48. A slot 50 extends from the aperture 46 to the end of the extension member 28. The fastening means 48 extends through the end 44 perpendicularly with respect to the slot 50, and the fastening means is threaded into a nut 52 retained on the opposite side of the end 44 from a knob 54 which is securely attached to the fastening means. By twisting the knob 54, the fastening means 48 forces the aperture 46 to constrict around the projection member 42 and thereby securely retains the guidance arm 20 to the extension member 28 at a selected position. With the exception of the retaining end means 44, the remainder of the elongated portion of the extension member 28 is star shaped (FIGS. 3 and 6).

The universal assembly means 30 operatively connects the extension member 28 at its star-shaped elongated portion to the tripod head 12 by providing a selectively adjustable and universal or swiveling connection to the shaft member 32 rigidly attached to the tripod head. The shaft 32 is threaded along its entire elongated length, as is shown best in FIGS. 2, 3 and 5. A sleeve member 56 is threaded onto one end of the shaft 32 and is held in position by a set screw 58. The other end of the sleeve 56 receives an adapter shank 59 which is operatively attached to the tripod head 12. In most conventional tripod heads the conventional control handle is typically threaded into a portion of the tripod head and when the control handle is tightened the tripod head is retained in a stationary position. By use of the sleeve 56, the conventional control handle is removed from the tripod head and an adapter shank is threaded into the tripod head in place of the control handle. The adapter shank 59 is securely attached to the sleeve 56 by a set screw 60 or other conventional means. At the other end of the shaft 32 from the sleeve 56, an outer knob 61 is securely attached to the shaft by a nut 62 retained to the shaft by a set screw 63. The rigid attachment of the knob 61 allows rotation of the shaft 32, sleeve 56 and adapter shank to control friction in the tripod head movement in a manner similar to that obtained by rotation of the conventional control handle. An inner knob 64 is threadably attached to the shaft 32 by a nut 65. The inner knob 64 is used in conjunction with the universal assembly means 30 as is described below.

Figure 2:
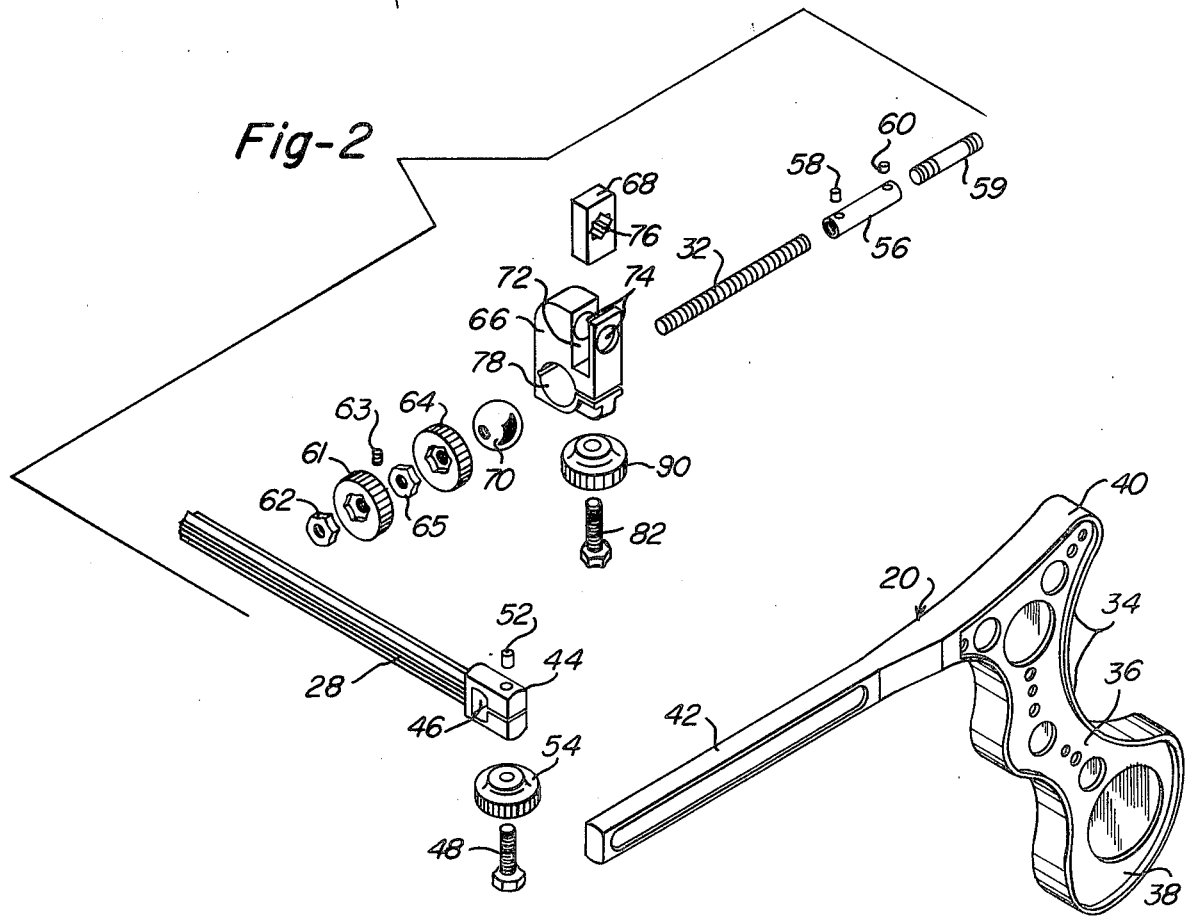
FIG. 2 is an exploded perspective view of the guidance apparatus shown in FIG. 1.
Figure 3:
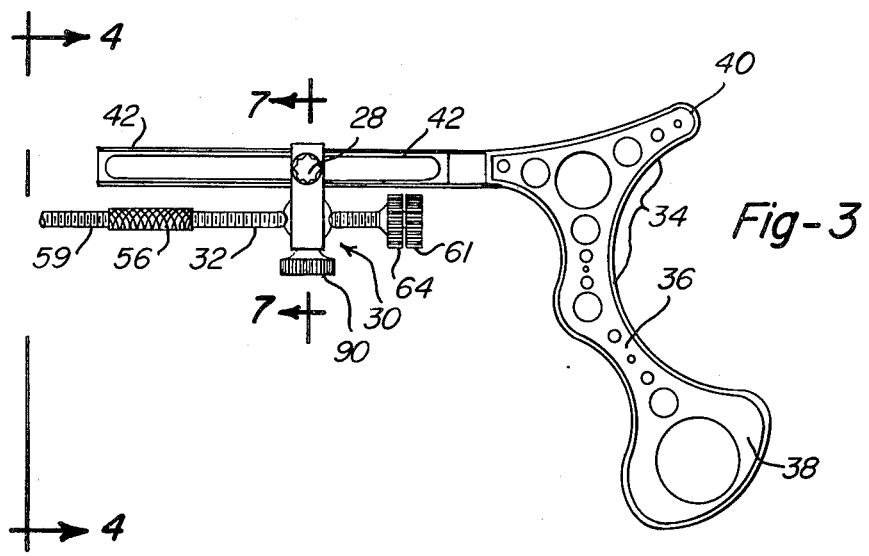
FIG. 3 is a side elevational view of the apparatus of FIG. 2 in assembled relationship.
Figure 4:
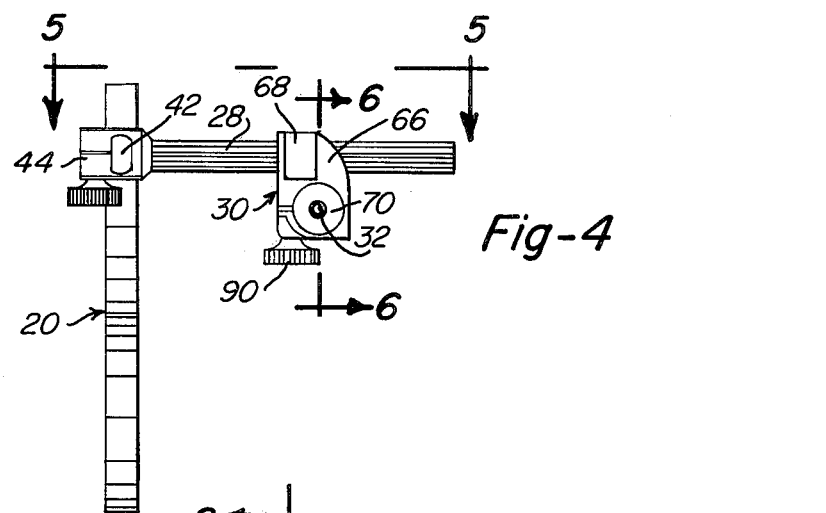
FIG. 4 is an end section view of FIG. 3 taken in the plane of line 4—4.

FIGS. 2, 6 and 7 thus illustrate the details of the universal assembly means 30. Elements of the universal assembly include a main housing member 66, a shear block 68 for operatively retaining the extension member 28 securely with respect to the main housing 66, and a swivel ball 70 threaded onto the shaft 32 for retaining the main housing 66 for universal movement with respect to the shaft 32. The swivel ball is constructed of relatively hard, resilient and compressible material such as plastic. A vertically extending slot 72 is formed in the housing 66 for receiving the shear block 68. A circular opening 74 extends through the housing 66 to receive the elongated star-shaped portion of the extension member 28. A star-shaped aperture 76 is formed in the shear block 68 in a configuration which receives and registers with the star-shaped portion of the extension member 28. The star-shaped aperture 76 prevents the extension member 28 from rotating with respect to the shear block 68 and main housing 66. A large circular opening 78 extends into the main housing 66 and receives the swivel ball 70. A slot 80 extends from the swivel ball receiving opening 78 through the main body 66 in a manner generally parallel to the opening 74. To rigidly position the extension member 28 with respect to the shaft member 32 and to limit or restrict universal movement provided by the swivel ball 70, the universal assembly 30 includes a tightening screw 82 extending in an aperture 84. The aperture 84 is formed in the main body member 60 perpendicularly with respect to the slot 80 and generally parallel to the slot 72. The threaded end 86 of the tightening screw 82 is threadably received in a threaded aperture 88 formed in the lower portion of the shear block 68. A knob 90 is securely attached at the other end of the tightening screw 86 for the purpose of gripping the tightening screw to rotate it.

Rotating the tightening screw 82 at the knob 90 simultaneously retains the extension member 28 to the main body member 66 and retains the swivel ball 70 against universal movement within the swivel ball receiving opening 78. Rotation of the tightening screw 82 pulls the shear block 68 into the bottom of slot 72. A shear force is applied to securely retain the extension member 28 at a selected position to the main body member 66. Simultaneously, rotating the screw 82 constricts the width of the slot 80 and thereby constricts the diameter or cross sectional area of the opening 78 around the swivel ball 70. Additional constriction of the opening 78 applies additional frictional retention force to the outside diameter of the swivel ball 70, and its slight compression also restricts the ability of the swivel ball to rotate on the threads of shaft 32. Although the amount of restriction against universal movement about the swivel ball 70 can be controlled by rotating the fastening screw 82, the amount of shear force applied to the extension member 28 is limited after the shear block 68 is seated in the bottom of slot 72. With a light or moderate amount of retention force, the swivel ball 70 will rotate about its threaded connection to the threaded shaft 32 and the main housing will swivel about the ball 70. As a consequence, the universal assembly means 30 allows the extension member 28 and attached guidance arm 20 to rotate, swivel and move in a universal manner about the axis of shaft 32 and with respect to the tripod head 12. To prevent such universal movement, screw 82 is securely tightened and knob 64 is threaded toward until it contacts the swivel ball 70. By screwing the knob 64 firmly against the swivel ball 70, rotation of the swivel ball with respect to the shaft 32 is further prevented.

Use of the guiding apparatus 10 can now be more fully understood by reference to FIG. 1. The shaft member 32 is operatively connected to the universal movement tripod head 12 by connecting the sleeve 56 to the adapter shank 59 connected to the tripod head 12. Frictional retention of the tripod head is adjusted by rotating the outer knob 61. The knob 90 attached to the tightening screw 82 of the universal assembly means is loosened, and the extension member 28 is extended at a selected position. The knob 54 of the extension member end retaining means 44 is loosened, and the projection member 42 of the guidance arm 20 is moved along its length to position the guidance arm 20 with the curved portion 34 abutting the shoulder front and the extension portion 36 and terminal end portion 38 extending intermediate the upper arm 24 and the upper torso 16. Once all of the adjustments are made to accommodate the individual and the use contemplated for the tripod, the knobs 54 and 90 are tightened. As an example of adjustability, in photography situations the individual photographer 15 adjusts the apparatus 10 in the manner described so that the individual's eye is placed in a comfortable position for sighting through the sight piece of the camera in all positions necessary to obtain the expected field of camera angle movement for adequately photographing a moving object.

Once all of the adjustments are made, the individual's upper arm 24 is pressed against the extension portion 36 and terminal end portion 38 of the guidance arm 20 to firmly retain the guidance arm 20 in a condition abutting the upper torso 16. By this arrangement, as the upper torso is moved, the tripod is moved in a graceful manner in accordance with the fluid movements of the individual user. Rapid, discontinuous and exaggerated movements of the tripod head 12 are prevented since the upper body of the user does not allow movements. Furthermore, control by the upper torso frees the individual user's hands for other uses, such as advancing the film and adjusting the camera. By gripping the extension member 36 between the upper arm 24 and the upper torso 16, a downward force is supplied to the camera tripod 14 which has the tendency for restricting the tripod against spurrious movement caused by wind or other environmental conditions. Due to the universal movement arrangement provided by the universal assembly means and the positioning of the guidance arm 20 abutting the shoulder front, the amount of camera angle or pan movement can be increased. The upper body torso is free to pivot about the hips from side to side while the eye of the individual remains in the sight piece of the camera. Such upper torso movement is not possible in a conventional tripod, since the conventional control handle must be positioned firmly against the chest of the user, thus preventing the chest and upper torso from pivoting significantly from side to side. It is apparent, therefore, that the present invention provides significant advantages over tripod apparatus in general, and allows the use of a relatively inexpensive friction controlled tripod head to obtain much better results than previously possible with the results being similar to those obtained from use of an expensive hydraulic fluid-controlled tripod head.

Although the present invention has been described with a certain degree of particularity, it is understood that the present disclosure has been made by way of preferred example and that changes in details of structure may be made without departing from the spirit and scope of the invention.

I claim as my invention:

1. Apparatus for controlling a universal movement head of support means as a result of movement of an individual using the support means, said support means for substantially stably supporting the universal movement head and any device such as a camera attached thereto independently of the individual using the support means, comprising in combination:
   control means for controlling movement of the movement head independently of hand movement of the individual, said control means comprising an arm grip structure having a generally planar contact portion extending generally parallelly between the upper torso and the upper arm of the individual, the contact portion defining an arm contact area of sufficient size to firmly retain the contact portion parallel with and against the upper torso with only upper arm pressure thereagainst; and
   connection means for operatively connecting said control means to the movement head and adapted for positioning said control means with respect to said movement head to maintain continuous contact of said control means with a portion of the upper torso during movement of the individual using said apparatus.

2. Apparatus as recited in claim 1 wherein:
   said support means comprises a tripod,
   said control means comprises shoulder contacting structure adapted for abutting the shoulder front of the individual using the tripod, and
   said connection means operatively transversely spaces the arm grip and shoulder contacting structures with respect to said universal movement head to contact the shoulder and extend between the torso and upper arm of the individual using the tripod.

3. Apparatus as recited in claim 2 wherein said control means further includes a guidance arm piece which defines the arm grip and shoulder contacting structures.

4. Apparatus as recited in claim 2 wherein said control means further comprises a guidance arm piece including a curved portion adapted for contacting the front of the shoulder and defining the shoulder contacting structure, and an extension extending from the curved portion defining the arm grip structure adapted to be gripped between the arm and the upper torso.

5. Apparatus as recited in claim 4 wherein said arm grip extension generally includes an enlarged terminal end portion defining the contact portion and adapted to facilitate gripping by the arm.

6. Apparatus as recited in claim 2 wherein said connection means includes means for operatively pivotably connecting said control means to the movement head.

7. Apparatus as recited in claim 2 wherein said connection means comprises:
   an extension member transversely extending and connected to said control means, and
   universal assembly means for operatively connecting said extension member for universal movement to the universal movement head.

8. Apparatus for controlling universal movement of a tripod head of a tripod as a result of movement of an individual using the tripod, comprising in combination:
   control means for controlling movement of the tripod head independently of hand movement of the individual, said control means comprising guide means adapted for abutting the shoulder of the individual using the tripod; and
   connection means for operatively connecting said control means to the tripod head and adapted for positioning said guide means with respect to said tripod head to contact the shoulder of the individual using the tripod, said connection means further comprising:
   an extension member connected to said guide means,
   an elongated shaft member adapted for operative attachment to one end of the tripod head and to extend away from the tripod head, and
   universal assembly means for operatively connecting said extension member for universal movement to said elongated shaft member at a distance along said elongated shaft member spaced from the tripod head.

9. Apparatus as recited in claim 8 wherein:
   said extension member is elongated and connected at a selected position along its length to said universal assembly means, and
   said universal assembly means receives said extension member transversely with respect to said shaft member.

10. Apparatus as recited in claim 9 wherein:
    said guide means includes an elongated projection member adapted to extend operatively forward from the shoulder of the individual using the tripod, and
    said extension member includes means for retaining said projection member at selected positions along the length of said projection member.

11. Apparatus as recited in claim 8 wherein said universal assembly means comprises a ball member operatively connected to said shaft member to rotate therearound and operatively connected to pivot said extension member with respect to said shaft member.

12. A method of using a universal movement head of a tripod in photographing objects, said use being achieved by a photographer using a camera, comprising the steps of:
  positioning the tripod for use,
  attaching the camera to the universal movement head of the tripod,
  providing a guidance arm,
  operatively universally attaching the guidance arm to the tripod head to control movement of the tripod head and camera by movement of the guidance arm,
  abutting the upper torso of the photographer and the guidance arm independently of the hands of the photographer,
  maintaining the guidance arm in continuous firm abutting contact with the upper torso of the photographer by gripping the guidance arm independently of the hands of the photographer, and
  pivoting the upper torso of the photographer from side to side about the hips to transmit substantially only the pivoting upper torso movement through the guidance arm to change the angular orientation of the camera on the tripod head independently of use of the hands.

13. A method as recited in claim 12 wherein the guidance arm provided includes an arm grip portion having a generally flat surface, and said method further comprises the steps of:
  inserting the flat surface of arm grip portion generally parallelly between the arm and upper torso of the photographer, and
  gripping the flat surface of arm grip portion by pressing the arm grip portion against the upper torso of the photographer with arm movement independently of the hands.

* * * * *